United States Patent
Geissler et al.

(10) Patent No.: US 10,580,153 B2
(45) Date of Patent: *Mar. 3, 2020

(54) OPTICAL NAVIGATION AND POSITIONING SYSTEM

(71) Applicant: MO-SYS ENGINEERING LIMITED, London (GB)

(72) Inventors: Michael Paul Alexander Geissler, London (GB); Martin Peter Parsley, London (GB)

(73) Assignee: MO-SYS ENGINEERING LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,716

(22) Filed: Mar. 11, 2019

(65) Prior Publication Data

US 2019/0206072 A1 Jul. 4, 2019

Related U.S. Application Data

(63) Continuation of application No. 14/772,072, filed as application No. PCT/GB2014/050624 on Mar. 3, 2014, now Pat. No. 10,275,899.

(30) Foreign Application Priority Data

Mar. 1, 2013 (GB) .................................. 1303712.2

(51) Int. Cl.
*G06T 7/579* (2017.01)
*H04N 5/222* (2006.01)
(Continued)

(52) U.S. Cl.
CPC .............. *G06T 7/579* (2017.01); *G01S 5/163* (2013.01); *G06T 7/246* (2017.01); *H04N 5/2224* (2013.01);
(Continued)

(58) Field of Classification Search
CPC ........... G01S 5/163; G06T 2207/10016; G06T 2207/30204; G06T 7/246
See application file for complete search history.

(56) References Cited

U.S. PATENT DOCUMENTS 10,275,899 B2 * 4/2019 Geissler .................. G01S 5/163
2007/0248283 A1 10/2007 Mack et al.
(Continued)

FOREIGN PATENT DOCUMENTS

JP 2003-265408 A 9/2003

OTHER PUBLICATIONS

Briechle et al. "Self-Localization of a mobile robot usingfast normalized cross correlation," Systems, Man, and Cybernetics, 1999. IEEE SMC '99 Conference Preceedings. 1999 International Conference on Tokyo, Japan Oct. 12-15, 1999, Piscataway, NJ, USA, IEEE, IS, vol. 4,12 (Year: 1999).*
(Continued)

*Primary Examiner* — Sath V Perungavoor
*Assistant Examiner* — Tyler B Edwards
(74) *Attorney, Agent, or Firm* — Haynes and Boone, LLP

(57) ABSTRACT

An optical navigation system comprising a camera oriented to face towards a plurality of markers located at spaced apart locations from the camera, calculating means adapted to calculate an angle subtended between pairs of markers, the subtended angles being calculated by monitoring the pixel locations of the markers in a series of images captured by the camera, the optical navigation system additionally comprising means for creating a three-dimensional model whereby the location of the camera relative to the markers is determined by triangulating the subtended angles in the three-dimensional model.

16 Claims, 1 Drawing Sheet

(51) Int. Cl.
  G01S 5/16      (2006.01)
  G06T 7/246     (2017.01)
  H04N 5/225     (2006.01)

(52) U.S. Cl.
  CPC ............ G06T 2207/10016 (2013.01); G06T
        2207/30204 (2013.01); G06T 2207/30241
    (2013.01); G06T 2207/30244 (2013.01); H04N
                             2005/2255 (2013.01)

(56) References Cited

U.S. PATENT DOCUMENTS

2010/0039506 A1   2/2010   Sarvestani et al.
2011/0096169 A1   4/2011   Yu et al.

OTHER PUBLICATIONS

Briechle et al. "Self-Localization of a mobile robot using fast normalized cross correlation," Systems, Man, and Cybernetics, 1999. IEEE SMC '99 Conference Preceedings. 1999 International Conference on Tokyo, Japan Oct. 12-15, 1999, Piscataway, NJ, USA, IEEE, IS, vol. 4 (Year: 1999).*

European Extended Search Report for European Application No. 18170435.4 issued by the European Patent Office dated Aug. 21, 2018, pp. 1-11.

Collewet et al., "Positioning a Camera With Respect to Planar Objects of Unknown Shape by Coupling 2-D Visual Servoing and 3-D Estimations," IEEE Transactions on Robotics and Automation, vol. 18, No. 3. Jun. 2002. pp. 322-333.

Vakazato et al., "A Localization System Using Invisible Retro-reflective Markers," Proceedings of the Ninth Conference on Machine Vision Applications, Tsukuba Science City, Japan. The University of Tokyo, Tokyo, Japan. May 16-18, 2005. pp. 140-143.

Van Rhijn et al., "Optical Tracking and Calibration of Tangible Interaction Devices," EGVE'05 Proceedings of the 11th Eurographics conference on Virtual Environments, Aalborg, Denmark. Oct. 6-7, 2005. pp. 41-50.

Briechle et al., "Self-Localization of a Mobile Robot using Fast Normalized Cross Correlation," Conference Proceedings of the IEEE International Conference on Systems, Man, and Cybernetics Society, Tokyo, Japan. Oct. 12-15, 1999. vol. 4. pp. IV-720-IV-725.

Asada et al., "Determining Surface Orientation by Projecting a Stripe Pattern," IEEE Transactions on Pattern Analysis and Machine Intelligence, IEEE Computer Society. vol. 10, No. 5. Sep. 1, 1988. pp. 749-754.

Natraj et al., "A geometrical approach for vision based attitude and altitude estimation for UAVs in dark environments," Intelligent Robots and Systems (IROS), 2012 IEEE/RSJ International Conference on Oct. 7, 2012, pp. 4565-4570.

International Search Report for PCT/GB2014/050624 dated Aug. 19, 2014.

Sim "Stable Exploration for Bearings-only SLAM", Robotics and Automation, 2005. Proceedings of the 2005 IEEE International Conference on Robotics and Automation, Barcelona, Spain Apr. 18-22, 2005, Piscataway, NJ, IEEE, pp. 2411-2416.

Roussillon et al., "RT-SLAM: A Generic and Real-Time Visual SLAM Implementation," Toulous, France. Available online at: http://www.iri.upc.edu/people/jsola/JoanSola/objectes/papers/ICVS2011/2011_ICVS_rtslam.pdf. pp. 1-10.

* cited by examiner

OPTICAL NAVIGATION AND POSITIONING SYSTEM

RELATED APPLICATIONS

This application is a continuation of U.S. patent application Ser. No. 14/772,072 filed Sep. 1, 2015, which is a U.S. National Stage patent application of International Patent Application No. PCT/GB2014/050624, filed on Mar. 3, 2014, which claims priority to United Kingdom Patent Application No. 1303712.2, filed on Mar. 1, 2013, each of which is herein incorporated by reference in their entirety.

This invention relates to an optical navigation and positioning system, suitable for use with cameras, and in particular, but without limitation, to optical navigation systems for cameras used in film and television filming environments, such as studios, on location or in outdoor studios.

Video cameras are often used in studios, and nowadays, are often integrated with Computer Generated Imagery (CGI) systems by which computer-generated images can be composited with the actual footage shot to create an augmented image in the outputted video. The use of CGI is extremely widespread, and is replacing the use of physical "sets" and backdrops in many film and television productions. CGI offers a number of advantages over traditional sets, in terms of realism, versatility and cost. Where the camera is static, it is relatively simple to composite the shot footage with CGI imagery to create the final rendered shot.

However, where the cameras need to move around the set, such as when panning and tracking, for example, the CGI compositing software needs to know the precise location of the camera relative to fixed points in order to create realistic CGI footage. If the camera's location is not precisely known, then the CGI software will fail to realistically render perspective, scale and shadows, for example, which can degrade the image quality of the composited video footage.

Existing CGI systems therefore integrate with the camera supports, which comprise tracking devices so that the instantaneous locations of the cameras can be fed into the CGI software to facilitate the rendering accurate CGI footage. Existing camera tracking systems comprise digital encoders, which monitor the yaw, pitch and roll of the camera, its focal length, zoom setting and so on. Existing camera tracking systems may additionally comprise ball trackers, which have a ball that rolls over the floor: the rotation of which is monitored using encoders to determine the camera's location by dead reckoning. By fitting a plurality of ball trackers to a camera's support, it is possible to calculate the support's position and rotation relative to, say, a studio floor.

Ball tracker systems, however, need to be regularly re-calibrated as they have a tendency to "drift", that is to say, provide unreliable data should one of the balls skid on the floor surface. Over time, therefore, each camera needs to be returned to a known position at intervals, and "reset" so that accumulated errors and drift in their ball tracker's measurements can be "zeroed out". The fact that the camera's position measurement is susceptible to errors and drift renders ball tracker systems unreliable, or at least insufficiently robust, in many filming situations.

A known alternative to mechanical measurement techniques, such as ball trackers, is to use optical navigation systems whereby a dedicated camera scans the studio ceiling for pre-placed markers or targets. The pixel locations of the markers in the ceiling-facing camera's images can be mapped onto a 3D computer model of the studio or the 3D model of the markers to enable the camera's location to be precisely triangulated. Optical navigation systems of this type are generally more reliable than ball tracker systems because as they are not susceptible to drift, the markers' locations being fixed in space. However, existing optical navigation systems rely on the accurate placement of the markers, and the accurate insertion of each marker's position in the 3D model: with even small inaccuracies potentially leading to large errors in the calculated position of the camera. As such, existing optical navigation systems for cameras need markers to be installed on an accurate grid system, which needs to be carried out using specialist surveying equipment, such as theodolites. In most cases, existing optical navigation systems work relatively well, but in a studio environment, where ceiling lighting etc. is adjusted regularly, and where there is a high probability of collisions between the ceiling markers and cranes or technicians rearranging lights or other ceiling hung equipment, say, they can be susceptible to failure.

A need therefore exists for an optical navigation system that does not rely on an absolute reference frame system, but rather one that can use "natural markers", such as existing features of a room's ceiling, and which can adapt to changes in the reference system.

Non-absolute optical navigation systems are also known, which make use of so-called "SLAM" (Simultaneous Localisation and Mapping), whereby a three dimensional model of a room based, say, on a number of images of the room's ceiling, can self-calibrate and update as the camera moves around. In general terms, SLAM works by measuring how the angle of several points of interest in an image shift relative to one another as the viewpoint moves. The angles are calculated by comparing pixel locations of the points of interest in the image from the centre pixel positions, which is assumed to like approximately on the optical axis of the view point, to obtain vectors to the points of interest. Rather than relying on an image based (bitmap) analysis process, as is the case in absolute optical navigation systems, SLAM systems build a three dimensional model based on vector angles, which is considerably more accurate, and which can determine not only the track (X &Y coordinates) location of the camera on the floor, but also its rotation relative to the room, and its elevation (Y-coordinate). SLAM systems can be very accurate.

A problem that is particular to SLAM systems used in studio filming environments is that of "blinding" the ceiling-facing optical navigation camera by the set lighting. Film set lighting tends to be very bright, which can obliterate the visible features that ceiling-facing SLAM systems need to work effectively.

A need therefore exists for an improved and/or alternative optical navigation system that addresses or overcomes one or more of the problems outlined above.

According to a first aspect of the invention, there is provided an optical navigation system comprising a camera oriented to face towards a plurality of markers located at spaced apart locations from the camera, calculating means adapted to monitor, in a series of images captured by the camera, the pixel locations of the markers, the optical navigation system additionally comprising means for creating a three-dimensional model of the camera's position and orientation relative to the markers by monitoring changes in the relative positions of the markers in the captured images to determine, by monitoring changes in the apparent perspective of the markers that are indicative of changes in orientation and position of the markers.

Suitably, the markers are randomly located or positioned, i.e. not accurately measured out.

The invention therefore provides an optical navigation system that falls somewhere between an accurate triangulation system in which the markers are placed a precise and known locations, and a SLAM system which uses natural features, such as the corners of a room or ceiling features, to determine the position and/or location of the camera. The invention, by contrast, provides a solution falling somewhere between these extremes, that enables randomly-placed markers to be used to improve the effectiveness of SLAM, whilst avoiding the need for the accurate placement of the markers, as is the case in a triangulation system. In certain embodiments, therefore, the invention overcomes one or more of the drawbacks of know systems, as outlined above.

According to a second aspect of the invention, there is provided an optical navigation system comprising a camera oriented to face towards a plurality of markers located at spaced apart locations from the camera, calculating means adapted to calculate an angle subtended between pairs of markers, the subtended angles being calculated by monitoring the pixel locations of the markers in a series of images captured by the camera, the optical navigation system additionally comprising means for creating a three-dimensional model whereby the location of the camera relative to the markers is determined by triangulating the subtended angles in the three-dimensional model.

A third aspect of the invention provides an optical navigation system comprising a camera ID oriented to face towards a plurality of markers located at spaced apart locations from the camera, calculating means adapted to calculate an angle subtended between pairs of markers, the subtended angles being calculated by monitoring the pixel locations of the markers in a series of images captured by the camera, the optical navigation system additionally comprising means for creating a three-dimensional model whereby the location of the camera relative to the markers is determined by triangulating the subtended angles in the three-dimensional model, and wherein the optical navigation system further comprises a light source located proximal to the camera and being arranged to project light away from the camera in the direction of the markers, and wherein the markers are retroreflective.

A fourth aspect of the invention provides an optical navigation system comprising two or more spaced apart cameras oriented to face towards a plurality of markers located at spaced apart locations from the cameras, calculating means adapted to calculate an angle subtended between pairs of markers, the subtended angles being calculated by monitoring the pixel locations of the markers in a series of images captured by the cameras, the optical navigation system additionally comprising means for creating a three-dimensional model whereby the location of each camera relative to the markers is determined by triangulating the subtended angles in the three-dimensional model. Suitable, one of the cameras is arranged to point at placed markers or using natural markers.

A fifth aspect of the invention provides an optical navigation system comprising a camera oriented to face towards a plurality of markers located at spaced apart locations from the camera, calculating means adapted to calculate an angle subtended between pairs of markers, the subtended angles being calculated by monitoring the pixel locations of the markers in a series of images captured by the camera, the optical navigation system additionally comprising means for creating a three-dimensional model whereby the location of the camera relative to the markers is determined by triangulating the subtended angles in the three-dimensional model, and wherein the optical navigation system additionally comprises an attitude sensor.

Suitably, the attitude sensor comprises either or both of an optical attitude sensor and a gyroscope.

By providing a light source next to the camera and by making the markers retroreflective, it has surprisingly been found that the markers "stand out" in images captured by the camera, even where the markers are located near to light sources facing towards the camera of the optical navigation system. Such an arrangement has been found to overcome the problem of the camera being blinded by bright ceiling lighting, which is commonly found in film and TV studios.

The known solution to the problem of "blinding" of the optical navigation system's camera by ceiling lighting has been to position some or all of the markers on the floor or walls of the studio, but by so doing, the markers can appear in the shot footage, which is highly undesirable. By using retroreflective markers, the markers can be placed on the ceiling, even where ceiling lighting is used.

Notably, the markers can be positioned at random locations or even moved, and the calculating means is able to "learn" its position by the apparent movement of the markers as the camera is moved in three dimensional space. Thus, even where certain markers are removed or added, the system is able to notice this and to compensate accordingly. The invention thereby overcomes the problem of the need for precise, fixed installation of the markers.

Where the optical navigation system comprises two or more cameras, the measurement of the camera's position is performed in stereo, thereby providing some redundancy. A further advantage of using two or more cameras, especially where they are arranged to face in different directions, is that the accuracy of the navigation system can be greatly improved because both cameras can be used to determine the location and/or attitude of the system using difference markers simultaneously.

One of the additional cameras may be arranged to point towards an object being filmed by a movie camera, in which case, a stereoscopic image of the subject, e.g. an actor, can be obtained to enable the three-dimensional form of the subject to be ascertained. By measuring the form of the subject at the time of capturing the video footage, it is possible to integrate this additional information into a connected CGI system to obtain improved rendering of shadows and lighting effects, etc. in the composited footage.

Where an optical attitude sensor is used, the optical attitude sensor suitably comprises a lighting system adapted to project a grid-like pattern of, say, infra-red light, towards a floor surface. By using "invisible" light, the projected light pattern does not affect, or show up in, movie footage shot simultaneously therewith.

The optical attitude sensor suitably comprises a light detector, such as an IR camera, which interprets the IR grid, as seen by the light detector, to ascertain the distance from a surface and the attitude of the system relative to the surface. By providing, say, a floor-facing optical attitude sensor in conjunction with an optical navigation system as described herein, the robustness of the measurement of the camera's position, elevation and attitude can be improved. The optical attitude sensor suitably comprises a Microsoft® Kinect™ system.

Additionally or alternatively, the attitude sensor may comprise a gyroscope rigidly affixed to the camera. A gyroscope, in certain circumstances, can provide a very accurate, and almost instantaneous, measurement of the camera's attitude. However, gyroscopes are susceptible to "drift" over a period of time. On the other hand, an optical navigation system, such as that described herein, is more accurate, over time, but due to the computation involved, can be slower to react. Therefore, by combining a gyroscope with an optical system as described herein, the invention can provide the best of both worlds, that is to say, the option to cross-compare the outputs to provide correction of one system or the other in real time.

Preferred embodiments of the invention shall now be described, by way of example only, with reference to the accompanying drawings in which.

Figure 1:
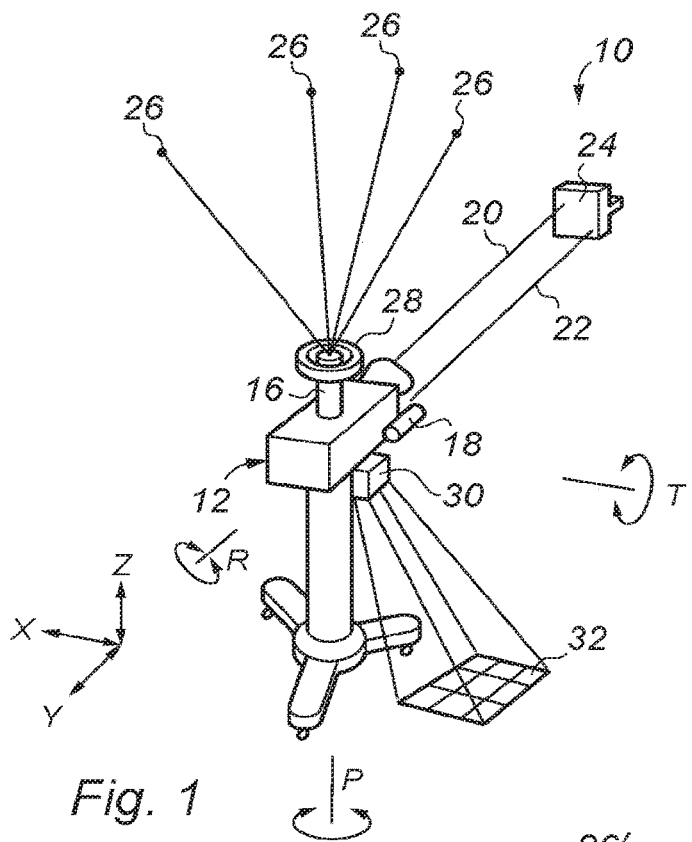
FIG. 1 is a schematic perspective view of an optical navigation system in accordance with the invention.

In FIG. 1, an optical navigation system 10 according to the invention comprises a movie camera 12 mounted for movement on a wheeled tripod 14 so that the movie camera can track X, Y, elevate Z, pan P, roll R and tilt T in accordance with an operator's (not shown) inputs. The movie camera 12 is fitted with an optical navigation system 10 comprising a ceiling facing camera 16 and a forward facing camera 18, the latter being fixedly aligned, but offset, with respect to the optical axis 20 of the movie camera 12 so that its optical axis 22 is parallel to that of the movie camera's 20. The movie camera 12 can thus capture video footage of a subject 24.

The studio in which the optical navigation system is installed additionally comprises a random or regular array of markers 26 stuck to the ceiling (not shown), lighting rails (not shown) or other objects located above the camera 12. Some of the markers 26 are retroreflective and the ceiling-facing camera 16 is fitted with an annular ring of LEDs 28 around its lens, which LEDs project a beam of visible light towards, and for illuminating, the markers 26.

The LEDs are mounted on a self-levelling mount, which may be actively driven by sensors or encoders, or it may be adapted to self-level under the effect of gravity (e.g. a gimbal). The levelling mechanism, where provided, makes sure that LEDs are pointing up towards the ceiling even when the main camera 12 is tilting up or down, or rolled. An advantage of this configuration is that the LEDs do not dazzle or blind the actors or interfere with set lighting.

In an alternative embodiment of the invention, several LEDs are disposed on a curved or arcuate surface, such as a dome. The system is suitably provided with an attitude sensor and the LEDs are individually switchable, or switchable in groups, so that only the LEDs that are facing upwardly are illuminated at a given point in time. Such a configuration ensures that at least some upwardly facing LEDs are illuminated, to illuminate markers placed above the system, whilst avoiding LEDs from shining towards the scene being shot, i.e. towards actors, which may be dazzling, distracting or otherwise undesirable, e.g. interfering with set lighting, as the camera is panned, tilted, or rolled.

The ceiling-facing camera 16 captures video footage of the area above the camera 12, which footage includes footage of the markers 26. By moving the camera X, Y, X, P, R, T, the positions of the markers 26 in the field of view of the ceiling-facing camera 16 change, as shall be explained below.

Also shown in FIG. 1 of the drawings is a floor-facing, optical attitude sensor 30, which projects a grid 32 of infrared light towards the floor. The optical attitude sensor 30 additionally comprises an infrared camera and a processor adapted to interpret the grid pattern that it "sees" to determine the pitch P, roll R and tilt T angle of the camera 12. In addition, if correctly calibrated, the optical attitude sensor can interpret the infrared grid 32 to determine the elevation Y of the camera 12 above the floor.

The optical attitude sensor 30 is essentially a depth sensor, giving points with distance at various positions in its field of view. By pointing the optical attitude sensor 30 towards the floor, it is possible to obtain a normal vector to the floor by assuming that the largest plane is the floor. The largest plane is a plane that passes through a furthest point in the picture or a plane that passes through the largest number of coplanar points. Measuring the normal vector will provide pan, roll and height information. By using a plane representing the floor, it is possible to reliably disregard points corresponding to obstructions in the field of view of the optical attitude sensor 30, such as the legs of the tripod, as shown in FIG. 1.

Figure 2:
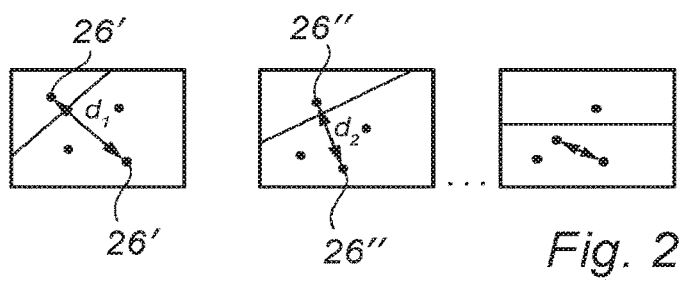
FIG. 2 is a series of schematic images of the markers as viewed by the cameras of the optical navigation system of FIG. 1.

FIG. 2 is a series of images as captured by the ceiling-facing camera 16, in which the markers 26 and other "natural" features 34 of the ceiling are visible. The captured video footage is essentially a bitmap image in which the markers 26 are placed at particular pixel locations. If the camera has a known field of view angle, the angular separation of points of interest in the captured images, in this case, the centres of the markers 26, will be a function of the number of pixels between those centres. Crucially, the distance to each point of interest is not known, nor is it needed, because the image lies in a virtual plane with the apparent positions of the markers 26 lying at known angular separations, thus yielding a pointing vector from the ceiling-facing camera 16 to each point of interest.

The optical navigation system "tracks" the movement of the markers 26, 36 in the images, and can compare their apparent positions from frame-to-frame of captured footage, enabling their relative positions to be calculated by triangulating the vectors. Thus, if the camera moves directly towards a particular marker, the apparent position of that marker will remain substantially constant. However, there will be a "zooming" effect visible in respect of the other markers, enabling the positions of the other markers to be calculated in three-dimensional space. Likewise, rotation of the ceiling-facing camera 16, for example, as the camera pans, will be detected as rotation of the markers 26 in the captured footage about various loci depending on their relative positions in actual space. Thus, the ceiling-facing camera 16 of the optical navigation system is capable of detecting movement of the movie camera 12 in three-dimensional space, in all six axes X, Y, X, P, R, and T.

Figure 3:
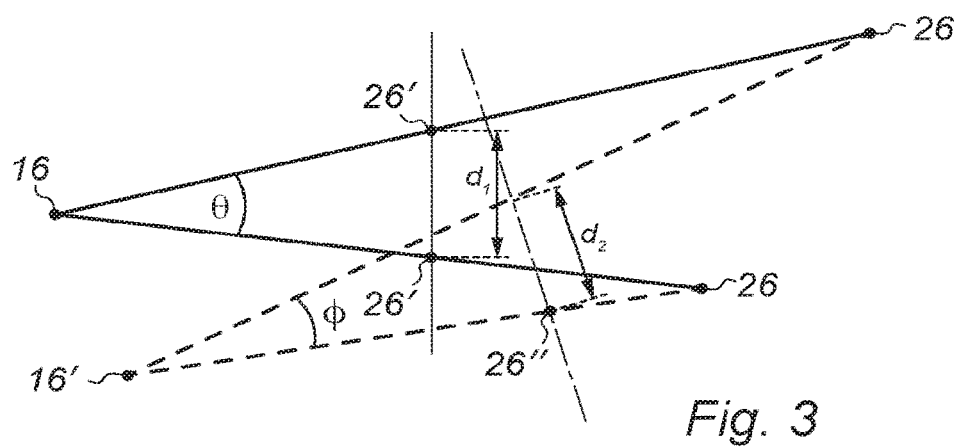
FIG. 3 is a schematic construct of the images of FIG. 2.

In FIG. 3, it can be seen how the apparent positions 26' of the markers 26 changes as the camera 16 moves from a first position to a second position 16'. The camera 16 identifies, in the illustrated example, two markers 26, which are at different distances from the camera 16. However, the camera 16 is only able to recognise line of sight, and not distance, so the apparent positions 26' of the markers 26 is shown in a virtual plane corresponding to the image plane. In the virtual plane, the distance d1 between the apparent positions of the markers 26' is related to the separation angle θ in three-dimensional space between the actual markers 26, as measured from the viewpoint of the camera 16.

In the second frame of FIG. 2, the camera 16 has moved to a different position and this is shown in FIG. 3 as 16'. The actual positions of the markers 26 in three-dimensional space remain the same, but their apparent positions 26" in the virtual image plane are shifted due to the change of viewpoint. Thus, the angle subtended φ, between the markers 26 is evident from a change of separation d2 in the image captured by the camera 16. By repeating this process from frame to frame, and by assuming that the positions of the markers 26 remains substantially constant, it is possible to triangulate the position of the camera 12 relative to the markers 26.

The use of retroreflective markers 26 alleviates or overcomes the problem of the markers becoming invisible when they are positioned close to floor-facing lights, i.e. towards the ceiling-facing camera 16. It also allows the markers to be used in lower level lighting conditions.

One or more of the placed markers 26 may comprise characteristic features, e.g. being of a particular shape or comprising a barcode, so that they can be automatically identified by a machine vision system. These markers may be precisely positioned to help scale all of the remaining markers, or to facilitate recalibration after having moved or removed one or more of the other markers. Surprisingly, it has been found that by placing a characteristic marker in each corner of the room/studio/set, it is possible to recalibrate the system more quickly.

The forward facing camera 18 captures a secondary image of the subject 24, providing valuable depth information, which can be used by a connected CGI compositing system (not shown) for more accurately rendering CGI shadows and lighting effects. Moreover, the forward-facing camera can also implement a secondary optical navigation routine, similar to that described above in relation to the ceiling-facing camera 16, albeit relying solely on "natural" features in its captured footage because it is undesirable to "clutter" the subject of the movie footage with markers 26, although they may be provided as well.

The forward facing camera 18 is used to monitor natural or placed markers in the field of view of the main camera 12, which can be used to provide viable information about the lens characteristics of main camera 12. The forward-facing camera 18 is suitably calibrated precisely, whereas the main camera 12 is often not calibrated as precisely because there is no time to do so on set and because zoom lenses change characteristics when zooming and focusing. Whilst encoders may be associated with the main camera 12 for determine the zoom and focus settings, the encoders generally lack the degree of accuracy needed by CGI systems. By using the forward-facing camera 18 in conjunction with the main camera 12, it is possible to calculate the instantaneous lens distortion of the main camera 12, which helps to add in the apparent distortion of the main camera 12 into the composited CGI image or model: i.e. the CGI distortion can be made to match that of the main camera 12 for a more realistic result.

In addition, by using a forward-facing camera 18, one can use natural or placed markers or reflective 3D information to be used in matching the virtual (CGI) world to features in the real world. For example, it is possible to snap a virtual floor to a real floor, to snap virtual wall to real wall or to snap a virtual table top to real one.

The invention claimed is:

1. An optical navigation system comprising:
a plurality of randomly positioned retroreflective markers, wherein it is assumed that the positions of the markers remains substantially the same;
a camera configured to capture a series of bitmap images in which at least some of the markers are visible, the markers being placed at particular pixel locations in the bitmap images;
the optical navigation system being configured to determine the location of the camera in three-dimensional space by:

monitoring the pixel locations of the markers in the series of bitmap images,
determining a distance (d1) between pairs of markers in the captured images, said distance being related to a separation angle ($\Theta$) in three-dimensional space between the actual markers, as measured from the viewpoint of the camera; and
monitoring changes of distance (d2) between pairs of markers in the images captured by the camera, repeating this process from frame to frame, and detecting movement of the camera in three-dimensional space.

2. The optical navigation system of claim 1, wherein the camera's location relative to the markers is determined by the angular separation between pairs of markers in the captured images, the angular separation ($\theta,\phi$) being a function of the number of pixels in the captured images between each pair of markers.

3. The optical navigation system of claim 1, wherein the movement of the camera is detected by comparing the apparent positions of the markers in the images from frame-to-frame of captured footage.

4. The optical navigation system of claim 3, wherein detection of the movement of the camera comprises detecting a zooming effect in the apparent positions of the markers.

5. The optical navigation system of claim 3, wherein detection of the movement of the camera comprises detecting rotation of the camera by detecting rotation of the markers in the captured images about various loci depending on their relative positions in actual space.

6. The optical navigation system of claim 1, further comprising a light source located proximal to the camera and being arranged to project light away from the camera in the direction of the markers, the light source comprising an annular ring of LEDs surrounding the camera lens, the LEDs being arranged to project a beam of visible light towards, and for illuminating, the markers, and wherein the light source is optionally mounted on a self-levelling mount being any one or more of the group comprising:
an actively driven mount comprising an attitude sensor and a transducer for maintaining the light source in a desired orientation relative to the horizontal; and
a gimbal.

7. The optical navigation system of claim 1, further comprising a light source located proximal to the camera and being arranged to project light away from the camera in the direction of the markers, wherein the light source comprises a plurality of LEDs disposed on a curved or arcuate surface, and wherein the light source comprises an attitude sensor and wherein the LEDs are individually switchable, or switchable in groups, so that only the LEDs that are facing substantially upwardly are illuminated at a given point in time.

8. The optical navigation system of claim 1, wherein at least one of the markers comprises a characteristic feature, the characteristic feature being any one or more of the group comprising: the marker being of a particular shape; the marker comprising a barcode; and the marker being automatically identifiable by a machine vision system.

9. The optical navigation system of claim 1, comprising two or more spaced apart cameras (16, 18) oriented to face towards a plurality of markers located at spaced apart locations from the cameras, the cameras being arranged to face in different directions, at least one of the cameras being a forward-facing camera and being arranged to point towards an object being filmed by another camera, the forward-facing camera being configured to capture a secondary image of the subject of the other camera.

10. The optical navigation system of claim 9, wherein the secondary image is used to implement a secondary optical navigation routine relying solely on natural features in its captured footage.

11. The optical navigation system of claim 1, further comprising any one or more of the group comprising:
- an optical attitude sensor comprising a lighting system adapted to project a grid-like pattern of light, towards a surface and a light detector adapted, in use, to interpret the grid-like pattern in its field of view to ascertain a distance from the surface and an attitude of the system relative to the surface, the optical attitude sensor comprising a depth sensor adapted to determine points with distance at various positions in its field of view;
- an attitude sensor comprising a gyroscope; and
- a ball tracker navigation system.

12. A system for capturing video footage comprising a camera moveably mounted on a moveable support for movement in 6 axes (track-X, track-Y, elevate, pan, roll and tilt), an optical navigation system according to any preceding claim rigidly affixed, for movement in unison with, the camera, and a plurality of retroreflective markers located at fixed positions above the camera.

13. The system of claim 12, wherein the optical navigation system comprises a ceiling-facing camera and a forward-facing camera, the forward-facing camera being fixedly aligned, but offset, with respect to an optical axis of the camera such that the forward-facing camera's optical axis is substantially parallel with, but offset relative to, the optical axis of the camera.

14. The system of claim 12, further comprising a CGI compositor and wherein the optical navigation system is adapted to provide camera position data for the CGI compositor.

15. A studio comprising the system of claim 12, wherein the markers are disposed in a random or regular array of markers on a ceiling, lighting rails or other objects located above the camera.

16. An endoscope comprising an optical navigation system according to claim 1, wherein the camera is rigidly mounted to a shaft of the endoscope and wherein the markers comprise retroreflective, self-adhesive markers affixable, in use, to a patient's body at positions surrounding, or proximal to, the insertion point of the endoscope.

* * * * *